(12) United States Patent
White

(10) Patent No.: US 9,805,382 B2
(45) Date of Patent: Oct. 31, 2017

(54) SYSTEM AND METHOD FOR PROCESSING OPINION DATA

(71) Applicant: AT&T Intellectual Property I, LP, Atlanta, GA (US)

(72) Inventor: Scott White, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/528,740

(22) Filed: Oct. 30, 2014

(65) Prior Publication Data

US 2015/0058085 A1 Feb. 26, 2015

Related U.S. Application Data

(63) Continuation of application No. 12/043,781, filed on Mar. 6, 2008, now Pat. No. 8,903,732.

(51) Int. Cl.
*G06Q 30/00* (2012.01)
*G06Q 30/02* (2012.01)
*H04N 21/442* (2011.01)
*H04N 21/475* (2011.01)
*H04N 21/643* (2011.01)

(52) U.S. Cl.
CPC ......... *G06Q 30/0203* (2013.01); *G06Q 30/02* (2013.01); *H04N 21/44222* (2013.01); *H04N 21/4755* (2013.01); *H04N 21/64322* (2013.01)

(58) Field of Classification Search
CPC .................................................... G05B 19/42
USPC ................................................. 725/46, 110
See application file for complete search history.

(56) References Cited

U.S. PATENT DOCUMENTS

| | | | | |
|---|---|---|---|---|
| 5,535,323 A | * | 7/1996 | Miller | G06F 9/4446 715/707 |
| 5,908,383 A | * | 6/1999 | Brynjestad | G06F 19/345 128/920 |
| 7,212,730 B2 | | 5/2007 | Boston | |
| 7,680,901 B2 | * | 3/2010 | Rechterman | G06Q 10/107 709/206 |
| 2003/0105694 A1 | | 6/2003 | Conkwright | |
| 2003/0172374 A1 | | 9/2003 | Vinson | |
| 2005/0081152 A1 | * | 4/2005 | Commarford | G06F 9/4446 715/705 |
| 2006/0184989 A1 | | 8/2006 | Slothouber | |

(Continued)

FOREIGN PATENT DOCUMENTS

EP 0263635 4/1998

OTHER PUBLICATIONS

The Nielsen Company, "Nielsen Media Research", 1 page, www.nielsenmedia.com/nc/portal/site/Public, website last visited Dec. 3, 2007.

(Continued)

*Primary Examiner* — Rokib Masud
(74) *Attorney, Agent, or Firm* — Guntin & Gust, PLC; Joseph Hrutka

(57) ABSTRACT

A system that incorporates teachings of the present disclosure may include, for example, a media processor having a controller to solicit an appraisal for each of a plurality of media programs presented by the media processor for composing a proposal to update one or more operational features of the media processor according to one or more consumer preferences determined from one or more supplied appraisals. Other embodiments are disclosed.

16 Claims, 7 Drawing Sheets

(56) References Cited

U.S. PATENT DOCUMENTS

| | | |
|---|---|---|
| 2007/0220554 A1 | 9/2007 | Barton |
| 2008/0040194 A1 | 2/2008 | Trauth |
| 2008/0092170 A1* | 4/2008 | Shannon ............ H04N 5/44543 725/46 |
| 2009/0142035 A1* | 6/2009 | Kummer ............ H04N 5/44543 386/296 |

OTHER PUBLICATIONS

White, "System and Method for Collecting Opinion Data", U.S. Appl. No. 11/972,474 dated Jan. 10, 2008, 37 Pages.

* cited by examiner

200

300

SYSTEM AND METHOD FOR PROCESSING OPINION DATA

CROSS-REFERENCE TO RELATED APPLICATION

This application is a Continuation of and claims priority to U.S. patent application Ser. No. 12/043,781, filed Mar. 6, 2008, the disclosure of which is hereby incorporated by reference into this application as if set forth herein in full.

FIELD OF THE DISCLOSURE

The present disclosure relates generally to opinion collection techniques and more specifically to a system and method for processing opinion data.

BACKGROUND

Reviews and opinion surveys of media content (such as television programs, movies, music, etc.) are commonly conducted by surveyors to determine among other things the potential value of the content, and how to commercialize it.

DETAILED DESCRIPTION

In one embodiment of the present disclosure, a computer-readable storage medium having computer instructions for distributing media programs to a set top box (STB), soliciting a consumer appraisal of each of the media programs consumed by the STB, receiving one or more consumer appraisals from the STB, determining one or more consumer preferences from the one or more consumer appraisals, and submitting a proposal to the STB to update one or more operational features of the STB according to the one or more consumer preferences.

In another embodiment of the present disclosure, a media processor having a controller to solicit an appraisal for each of a plurality of media programs presented by the media processor for composing a proposal to update one or more operational features of the media processor according to one or more consumer preferences determined from one or more supplied appraisals.

In yet another embodiment of the present disclosure, a method can involve soliciting from a media processor reviews of a plurality of media programs presented thereby for composing a proposal to update one or more operational features of the media processor.

Figure 1:
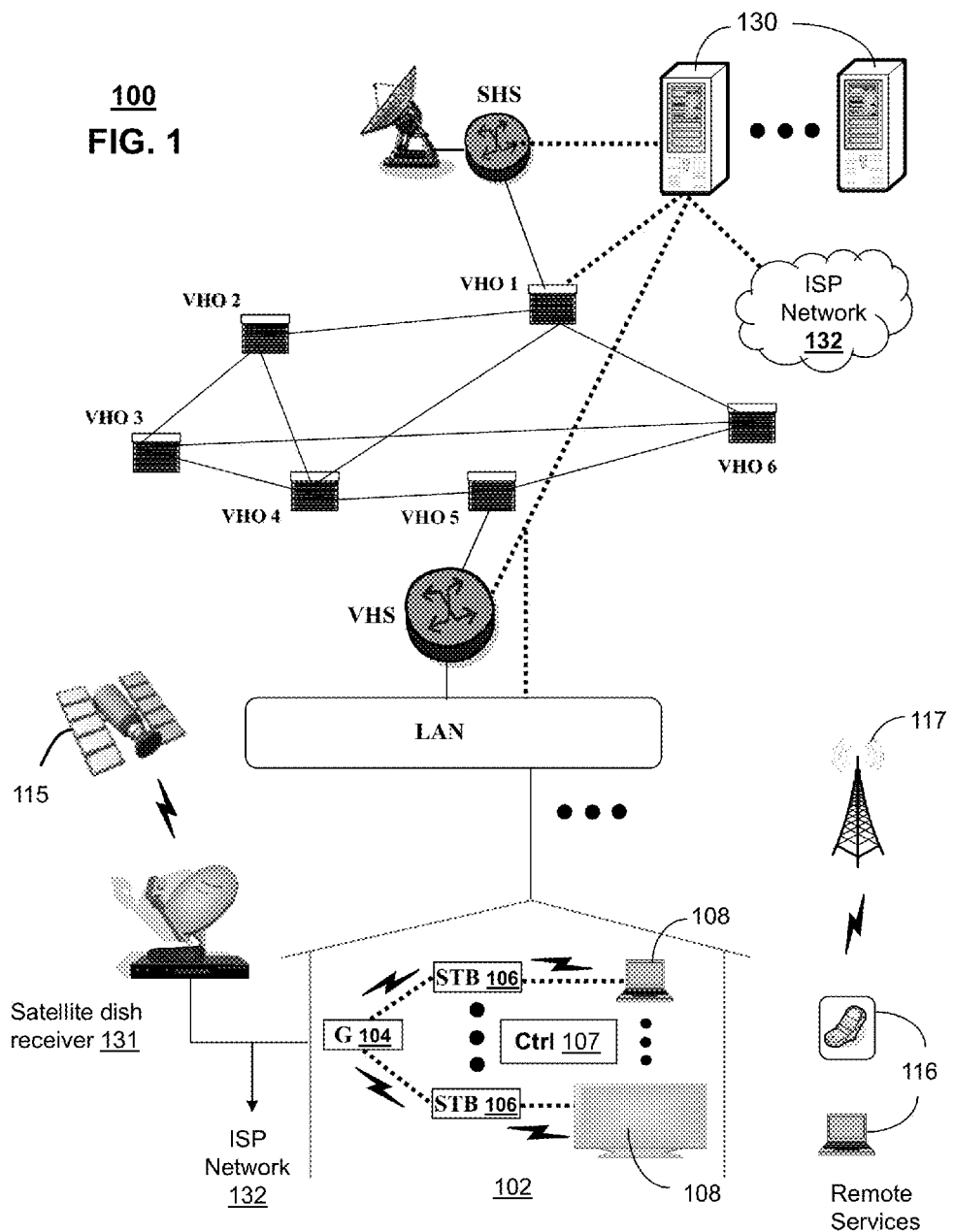
FIGS. 1-4 depict exemplary embodiments of communication systems that provide media services.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). Another distinct portion of the one or more computing devices 130 can be used as a media appraisal system (herein referred to as media appraisal system 130) for collecting and analyzing consumer appraisals of media programs supplied by subscribers of the first communication system 100.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
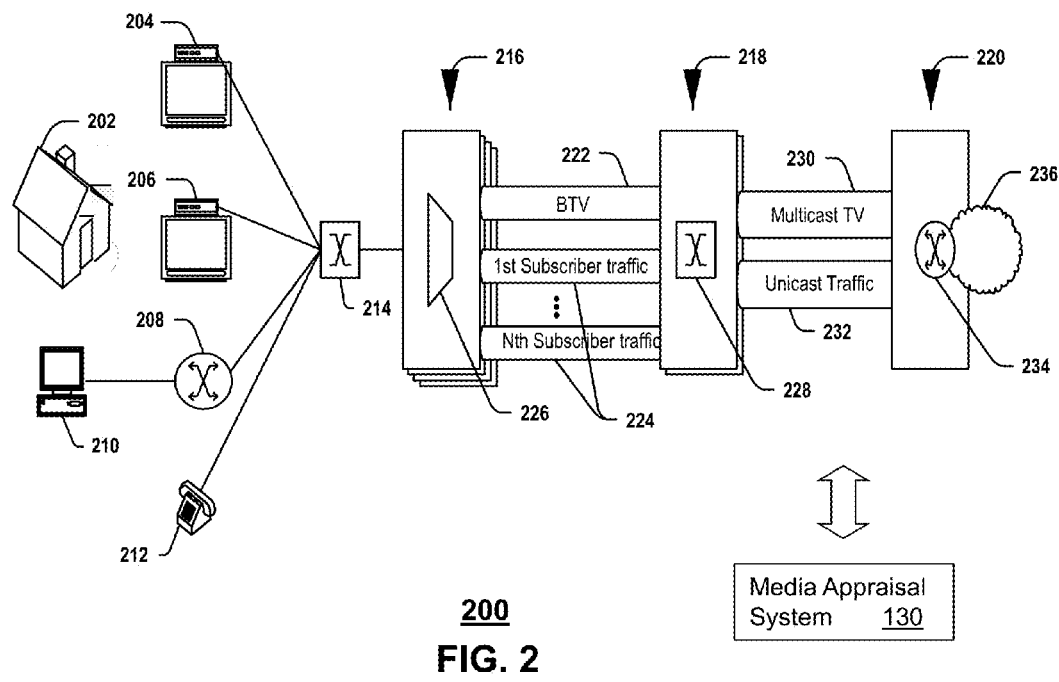

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a (DSLAM). The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The media appraisal system 130 of FIG. 1 can be applied to the second communication system 200 for collecting and analyzing consumer appraisals of media programs supplied by subscribers of the second communication system.

Figure 3:
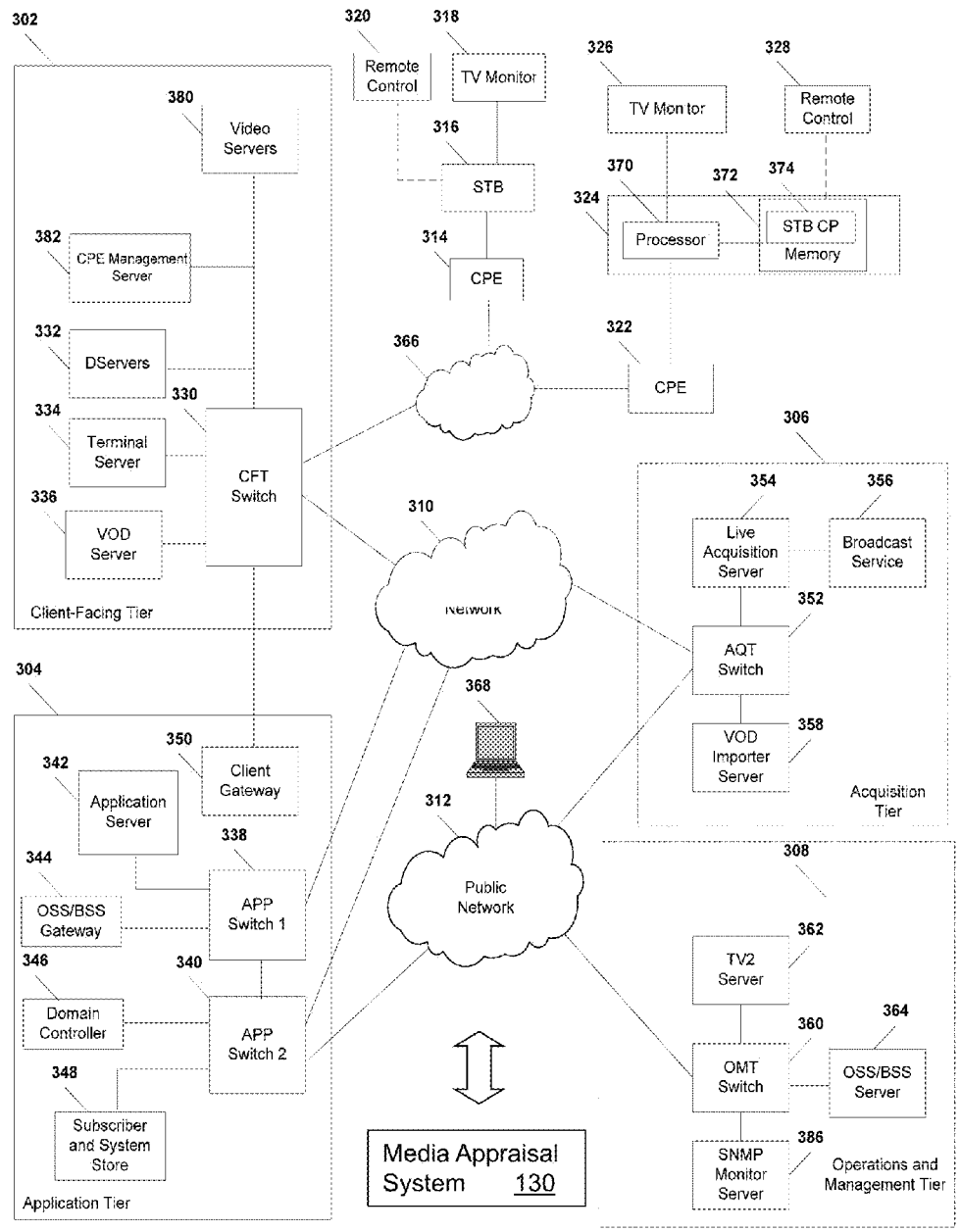

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The media appraisal system 130 of FIGS. 1-2 can also be applied to the third communication system 300 for collecting and analyzing consumer appraisals of media programs supplied by subscribers of the third communication system.

It should be apparent to one of ordinary skill in the art from the foregoing media system embodiments that other suitable media systems for distributing broadcast media content as well as peer-to-peer exchange of content can be applied to the present disclosure.

Figure 4:
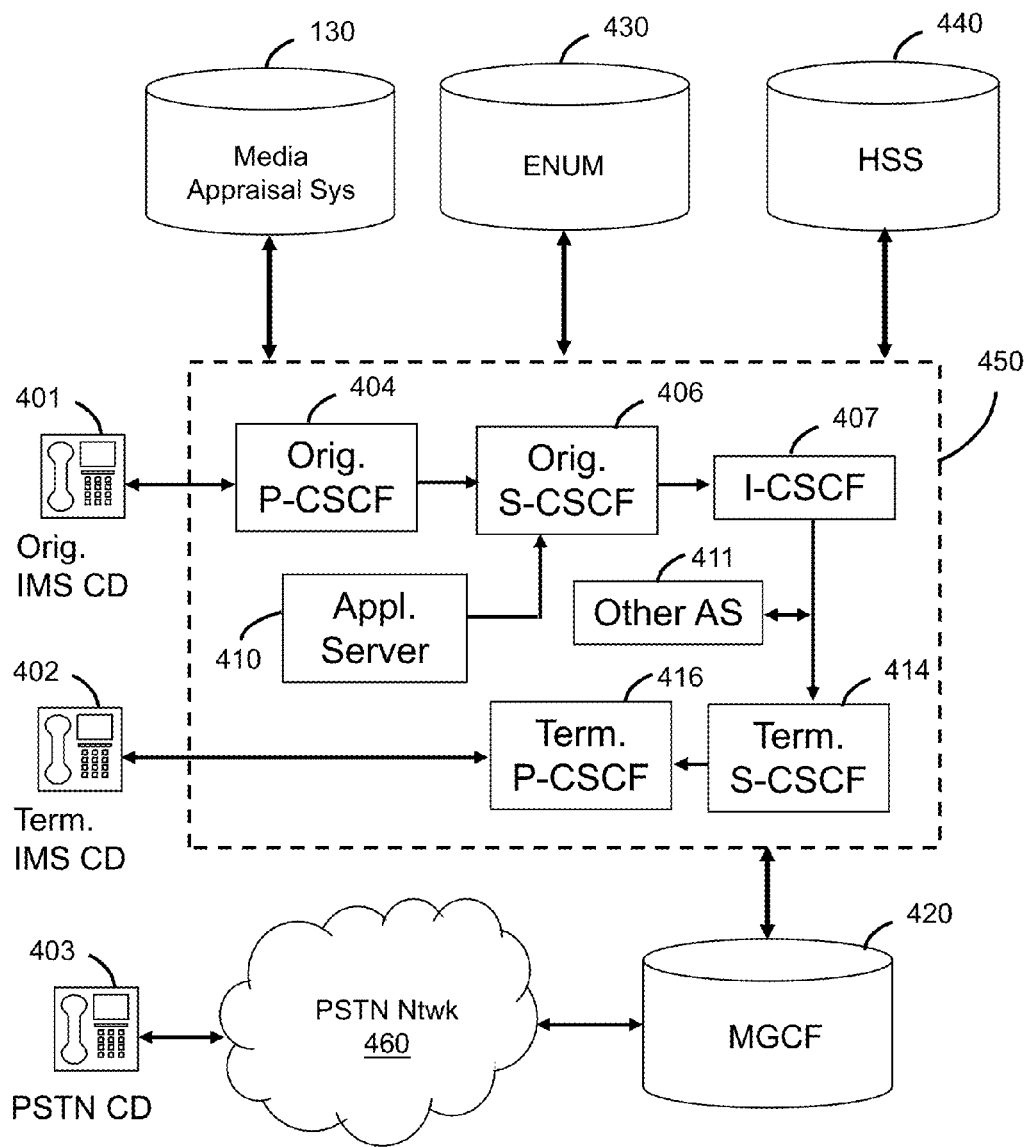

FIG. 4 depicts an exemplary embodiment of a communication system 400 employing a IP Multimedia Subsystem (IMS) network architecture. Communication system 400 can be overlaid or operably coupled with communication systems 100-300 as another representative embodiment of said communication systems.

The communication 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) support by the HSS 440. To accomplish a communication session between CDs, an originating IMS CD 401 can submit a SIP INVITE message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 115 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (not shown).

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the media appraisal system 130 previously discussed for FIG. 1. In this representative embodiment, the media appraisal system 130 can be accessed over a PSTN or VoIP channel of communication system 400 by common techniques such as described above.

Figure 5:
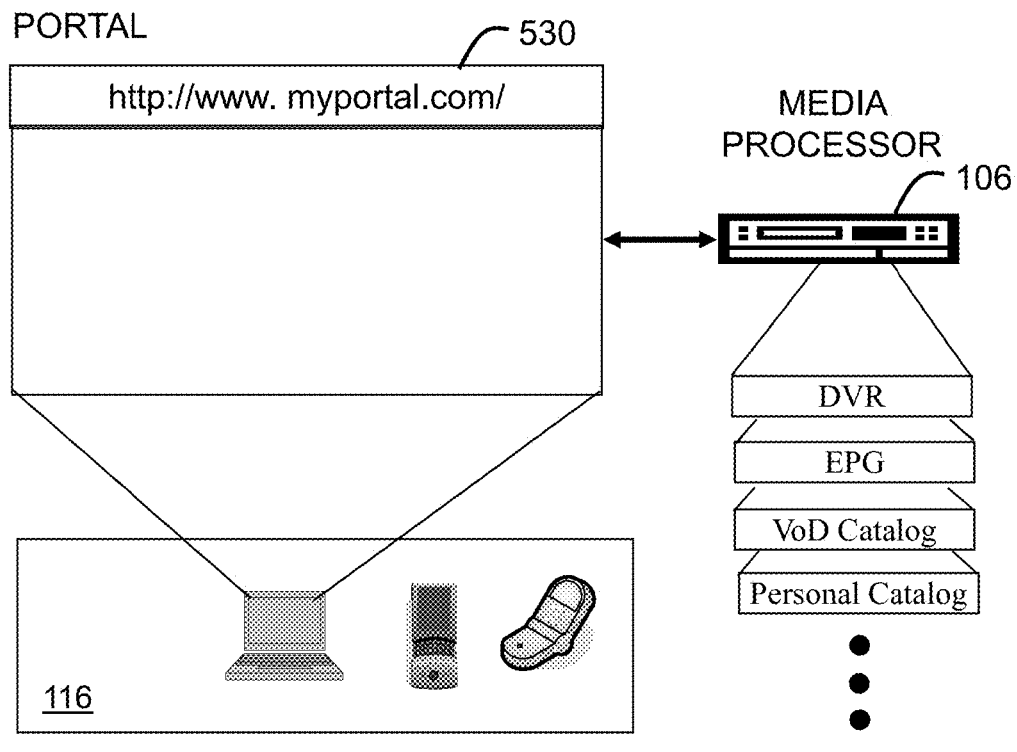
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), and so on.

Figure 6:
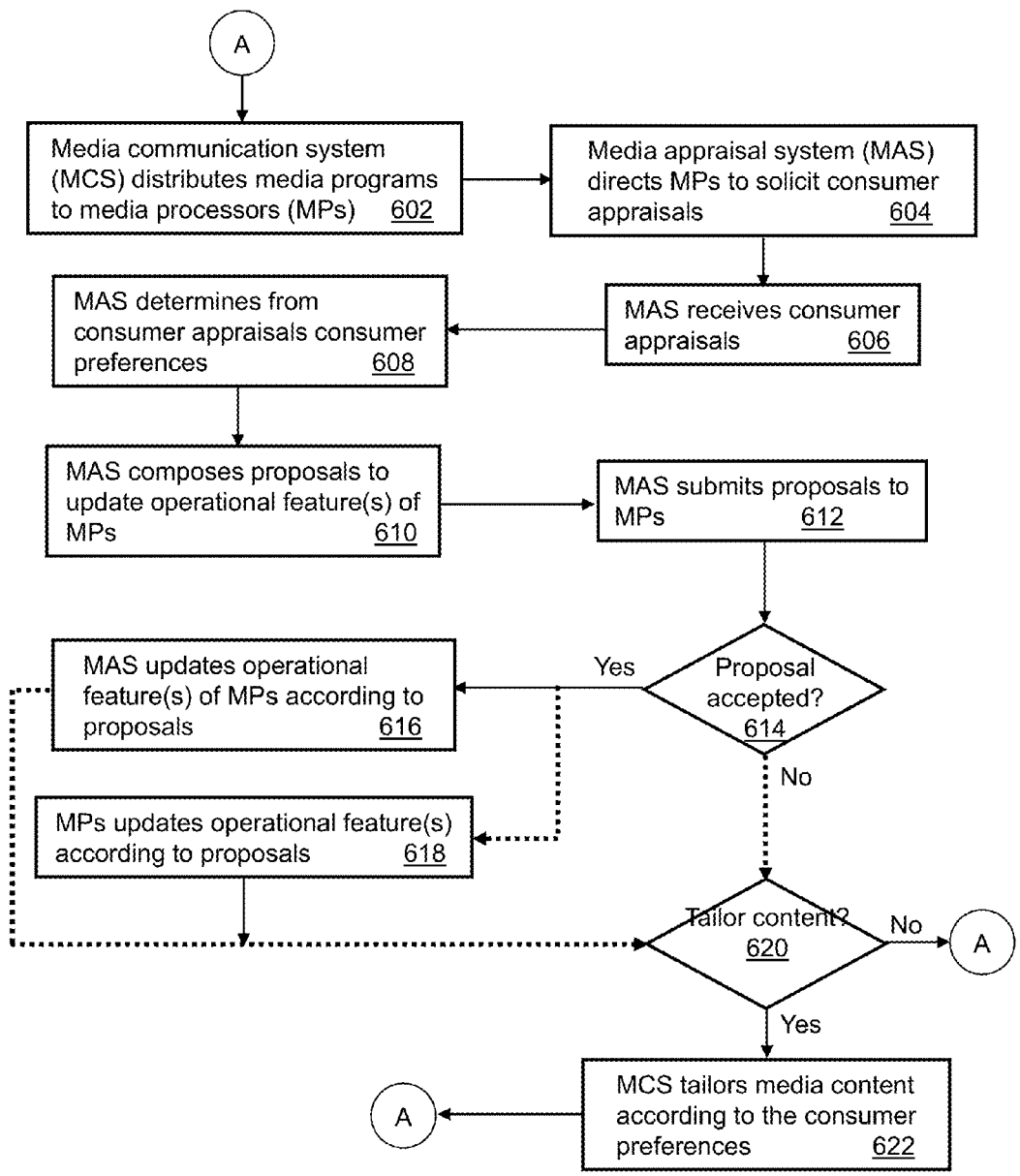
FIG. 6 depicts an exemplary method operating in portions of the communication systems of FIGS. 1-4.

FIG. 6 depicts an exemplary method 600 operating in portions of communication systems 100-400. Method 600 begins with step 602 in which one or more of the previously described media communication systems distribute media programs to media processors such as the STBs of FIGS. 1-3. The media programs can be audio content (radio, music, advertisements, etc.), video content (TV programs, movies, games, advertisements, etc.), or combinations thereof. The media appraisal system (MAS) 130 can direct in step 604 the media processors to solicit viewers of the media programs to provide a consumer appraisal of the program being consumed.

The consumer appraisal can be in the form of a survey supplied by the MAS 130 to the media processors that solicits feedback from the consumer about the media content consumed thereby. The survey can be simple and succinct, or comprehensive in its inquiries. For example, the survey can request a rating of media content on a scale of one to five stars (5 stars being the highest rating indicating that the consumer was exceedingly impressed with the content), and/or the survey can prompt the consumer with a battery of pointed questions about the content to more selectively determine the consumers biases. Sample questions might look like, "Was the program too long? Rate the following scenes on a scale of 1 to 5. Which songs did you like best from the music album? Rate each song on a scale of one to five?."

The solicitations made by the MAS 130 in step 604 can be random, or selective. For example, a service provider of the media communication system may know that a particular household has multiple media processor subscribers. The MAS 130 can selectively submit surveys to each subscriber. Moreover, the MAS 130 can distribute surveys tailored to the type of media content typically consumed by each subscriber. In another illustrative embodiment, the MAS 130 can submit surveys randomly without selectively sampling subscribers.

Each of the parties solicited with a survey can complete the survey by common means. For example, the survey can be presented in a graphical user interface (GUI) presented by the media processor on a media presentation device such as a television, computer display, or otherwise. The subscriber can complete the survey utilizing a remote controller such as reference 107 by navigating through the GUI and making selections to answer the inquiries. In another illustrative embodiment, the subscriber can utilize a keyboard or computer mouse to accomplish the same task.

Once the consumer appraisal surveys have been completed, the MPs submit the consumer appraisals to the MAS 130 in step 606. The MAS 130 can then utilize common pattern recognition techniques to identify demographic and/or psychographic patterns in the consumer appraisals. Patterns can also be identified hierarchically. For example, the MAS 130 can be directed to analyze the consumer appraisals collectively (e.g., at a national level). The MAS 130 can also be directed to analyze the appraisals by region (e.g., city, state, county, etc.), by household, and/or by subscriber. From these patterns the MAS 130 can synthesize consumer preferences at a national level, by region, by household, and by subscribers.

With the consumer preferences determined by the MAS 130 in step 608, the MAS can compose in step 610 proposals for updating one or more operational features of each of the media processors supplying responses to the surveys submitted in step 604. The proposals can be composed on a national level, regional level, household level, subscriber level, or combinations thereof. Operational features of the media processors can include for example settings for DVR recordings, settings for EPG customization, search algorithms used by the media processor, parental control settings, help menus used by the media processor, multi-user account settings, media content software applications used by the media processor, and so on.

A proposal can include any number of operational updates. For example a proposal tailored to a subscriber can propose an update for customizing an EPG according to consumer preferences of the subscriber (e.g., liberal news stations and channels deemed inappropriate for children are removed from EPG). The same proposal can propose an update for DVR settings to record media programs which likely appeal to the subscriber (e.g., sci-fi programs, documentaries about WW I or II, certain comedy shows, etc.). The proposal can further tailor a help menu of the media processor to provide more or less detailed information depending on a determined level of technical expertise of the subscriber. Suppose for example that the MAS 130 determines from the consumer preferences that the subscriber consumes a lot music and video content. Based on this understanding, the MAS 130 can further propose to update the software applications of the media processor to provide media control features that enhance the subscriber's experience.

The foregoing illustrations can also be applied at a national, regional, and/or community level. Based on these illustrations, it would be apparent to one of ordinary skill in the art that there can be many or perhaps innumerable determinations which can be made from synthesized consumer preferences to compose proposals similar to or different from the ones described above.

Once the proposals have been composed by the MAS 130 in step 610, the MAS submits them in step 612 to the media processors. The media processors can in response present by way of a media presentation device (e.g., a TV, computer terminal) the proposals to the corresponding subscribers prompting a request to accept or reject the updates in a GUI. The proposals can be accepted in whole or in part. That is, a subscriber can navigate through the proposed updates and accept some updates while rejecting others. If a proposal is accepted in whole or in part, the MAS 130 proceeds to step 616 where it updates one or more operational features of the media processor according to the accepted updates. In another illustrative embodiment, the media processors can perform the updates without assistance of the MAS 130 in step 618.

While the MAS 130 or the media processors 130 are performing the updates, the MAS can decide in step 620 to tailor media content in step 622 according to consumer preferences determined at a national level, regional level, subscriber level, or combinations thereof. The MAS 130 can for example determine at a national level which media programs (e.g., advertisements, TV shows, audio content, etc.) had the most and least appeal to consumers and can make adaptations thereof. The MAS 130 can also tailor media content per subscriber (e.g., targeted advertisements, targeted sale of audio content, targeted sale of video content, etc.). The tailored media content is then redistributed to the media processors by the media communication system in step 602.

Once again the MAS 130 repeats the process of synthesizing consumer preferences from appraisals received from the solicited media processors, thereby composing new proposals for updating the operational features of the media processors to enhance the consumer experience. The MAS 130 also continues to adapt when warranted the media content according to the consumer preferences synthesized thereby. By cycling in this manner, the MAS 130 can reformulate new proposals and re-tailor media content as subscribers interests and biases evolve.

Upon reviewing the aforementioned embodiments, it would be evident to an artisan with ordinary skill in the art that said embodiments can be modified, reduced, or enhanced without departing from the scope and spirit of the claims described below. Other suitable modifications that can be applied to the present disclosure without departing from the scope of the claims below. Accordingly, the reader is directed to the claims section for a fuller understanding of the breadth and scope of the present disclosure.

Figure 7:
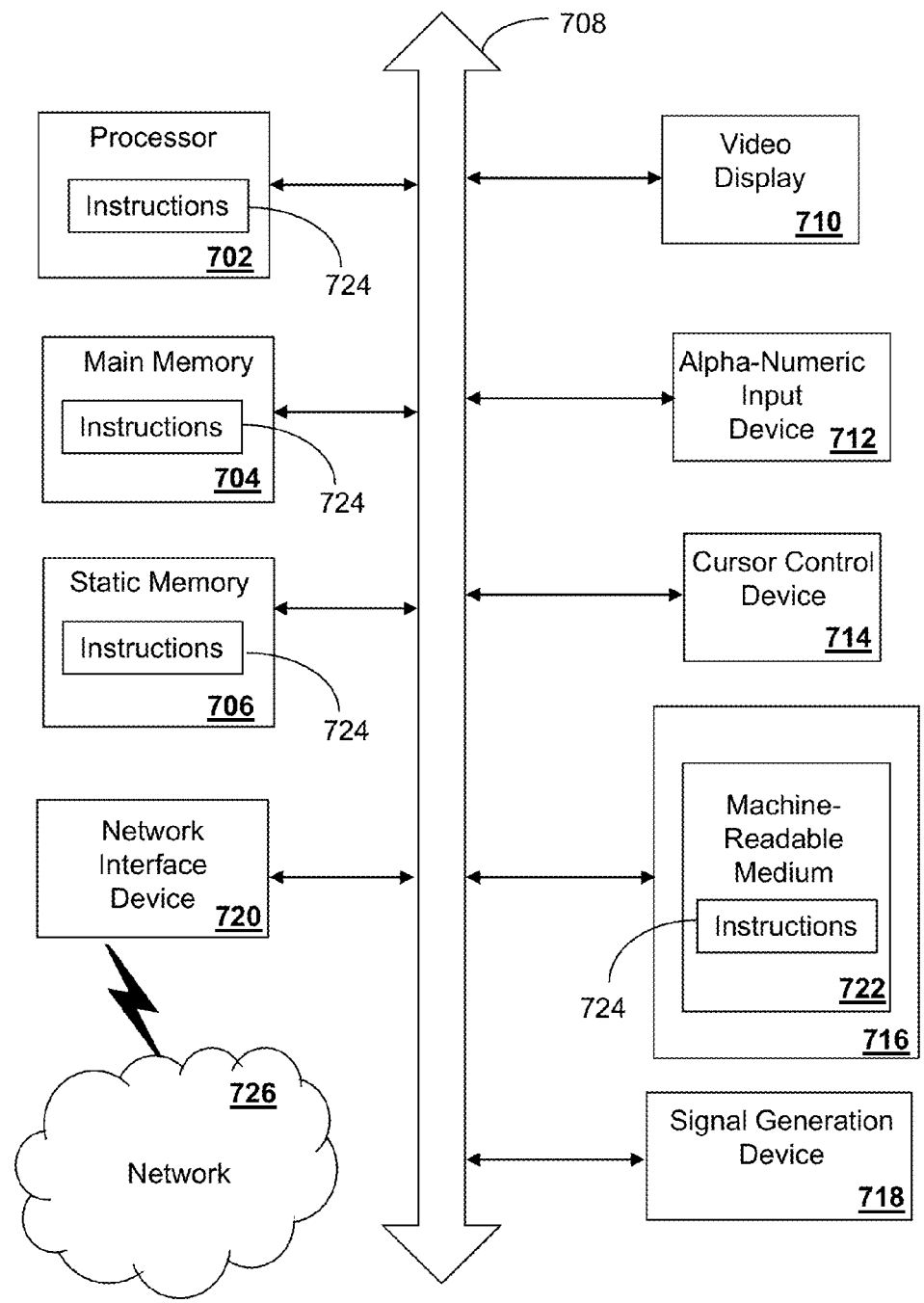
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising executable instructions that, when executed by a processing system including a processor, facilitate performance of operations, comprising:
   determining whether a household comprises a plurality of media subscriptions;
   presenting, responsive to determining that the household comprises the plurality of media subscriptions, a graphic user interface at a media presentation device of one of the plurality of media subscriptions for providing a survey regarding the plurality of media subscriptions for a subscriber of plurality of media subscriptions;
   receiving a completed survey regarding the plurality of media subscriptions;
   determining a consumer preference from the completed survey, wherein the consumer preference includes an indication of a level of technical expertise of the subscriber;
   determining a level of technical expertise of a user from the completed survey;
   determining a proposed modification according to the consumer preference, wherein the proposed modification includes software updates related to the plurality of media subscriptions to adjust an operation control of the media presentation device, wherein the proposed modification comprises adjusting an amount of information presented in a command menu based on the level of technical expertise for the media presentation device, and wherein the proposed modification includes downloading content software applications executable by the media presentation device to provide additional media control features not already available at the media presentation device;
sending the proposed modification to an electronic programming guide of a respective one of the media presentation device; and
receiving an acceptance of the proposed modification to the electronic programming guide of the media presentation device.

2. The non-transitory storage medium of claim 1, wherein the processor operates in a server of an interactive television system, and wherein the proposed modification further includes changes to a content search algorithm of the electronic programming guide.

3. The non-transitory storage medium of claim 1, wherein the operations further comprise:
identifying a plurality of users associated with the media presentation device;
determining consumption preferences for each of the plurality of users associated with the media presentation device; and
sending to the media presentation device a group of proposed modifications that are on a per user basis.

4. The non-transitory storage medium of claim 3, wherein the group of proposed modifications include a first proposed modification for a first user of the plurality of users associated with the media presentation device that differs from a second proposed modification for a second user of the plurality of users associated with the media presentation device,
wherein presenting the graphic user interface further comprises providing customized surveys to each of the plurality of users, wherein the customized surveys are generated based on a monitored media consumption history for each of the plurality of users.

5. The non-transitory storage medium of claim 1, wherein the operations further comprise tailoring media content presented at the media presentation device according to the consumer preference.

6. The non-transitory storage medium of claim 5, wherein the operations further comprise generating surveys based on monitored media consumption at the media presentation device.

7. The non-transitory storage medium of claim 1, wherein the proposed modification comprises a modification of the command menu.

8. A media processor, comprising:
a processing system including a processor; and
a memory that stores executable instructions that, when executed by the processing system, facilitate performance of operations, comprising:
presenting a graphic user interface operable for soliciting a plurality of consumer appraisals corresponding to a plurality of users associated with the media processor and corresponding to a plurality of media programs presented by the media processor;
determining of a level of technical expertise of a subscriber associated with the media processor based on a consumer appraisal of the subscriber from the plurality of consumer appraisals;
generating a proposed modification according to a level of technical expertise determined from a plurality of consumer appraisals generated by the plurality of users, wherein the proposed modification comprises software installation related to a plurality of media subscriptions for the media processor and software applications to provide additional media control features not already available at the media processor;
presenting the proposed modification to an electronic programming guide of the media processor; and
updating the electronic programming guide according to the proposed modification and responsive to receiving an acceptance of the proposed modification at the media processor.

9. The media processor of claim 8, wherein the level of technical expertise is determined from the plurality of consumer appraisals based on demographic and psychographic patterns detected in the plurality of consumer appraisals, and
wherein the operations further comprise generating the proposed modification to the electronic programming guide of the media processor.

10. The media processor of claim 8, wherein the operations further comprise:
recording the plurality of consumer appraisals for each of the plurality of media programs as a recorded plurality of consumer appraisals;
submitting to a media communication system the recorded plurality of consumer appraisals; and
receiving the proposed modification to the electronic programming guide of the media processor determined from the plurality of consumer appraisals supplied by the media processor.

11. The media processor of claim 10, wherein the operations further comprise sending to the media communication system an indication of the acceptance of the proposed modification at the media processor.

12. The media processor of claim 10, wherein the operations further comprise receiving media content tailored according to the level of technical expertise from the media communication system.

13. The media processor of claim 12, wherein the media content comprises media programs, advertisements, and merchandising recommendations tailored according to the level of technical expertise, and
wherein the graphic user interface for soliciting the plurality of consumer appraisals includes a group of customized surveys, wherein each of the customized surveys is generated based on a monitored media consumption associated with the plurality of users.

14. The media processor of claim 8, wherein the proposed modification includes reducing an amount of information in a help menu based on the determining of the level of technical expertise of the subscriber associated with the media processor.

15. A method, comprising:
presenting, by a processing system comprising a processor, a graphic user interface for collecting a plurality of reviews corresponding to a plurality of users associated with a plurality of media subscriptions;
receiving, by the processing system, the plurality of reviews generated by the plurality of users associated with the plurality of media subscriptions;
determining, by the processing system, a level of technical expertise of the one of the plurality of users associated with the plurality of media subscriptions;
composing, by the processing system, a proposed modification according to the plurality of reviews, and wherein the proposed modification includes reducing an amount of information in a menu based on the determining of the level of technical expertise of the one of the plurality of users, and wherein the proposed modification includes downloading content software applications to provide additional media control features not already available at the processing system; and transmitting, by the processing system the proposed modification to an electronic programming guide of a media device comprising installing software related to the media subscriptions, wherein the media device updates the electronic programming guide responsive to receiving an acceptance at the media device of the proposed modification.

16. The method of claim 15, wherein the reducing the amount of information in the menu comprises tailoring content of a help menu.

* * * * *